United States Patent [19]
Santilli

[11] 3,761,727
[45] Sept. 25, 1973

[54] ALTERNATOR POWER SOURCE
[76] Inventor: Raymond R. Santilli, P.O. Box 1032, Oklahoma City, Okla. 73101
[22] Filed: Mar. 16, 1972
[21] Appl. No.: 235,281

[52] U.S. Cl. ................................ 290/40, 290/1
[51] Int. Cl. ........................................ H02p 9/04
[58] Field of Search .................. 290/40, 1, 37, 38

[56] References Cited
UNITED STATES PATENTS

| | | | |
|---|---|---|---|
| 3,513,325 | 5/1970 | Tharp | 290/40 |
| 3,192,344 | 6/1965 | Teter | 290/40 |
| 3,098,191 | 7/1963 | Cavert et al. | 290/40 X |
| 3,082,353 | 3/1963 | Cohen et al. | 290/40 |
| 3,070,705 | 12/1962 | Forss et al. | 290/40 |
| 2,680,818 | 6/1954 | Ringwald | 290/40 |

Primary Examiner—G. R. Simmons
Attorney—Robert K. Rhea

[57] ABSTRACT

A power tool operating current is obtained from the alternator of a vehicle engine. A circuit is connected with the vehicle alternator to battery wiring and includes a solenoid operating a vacuum actuated diaphragm for increasing the engine speed and including a relay disconnecting the battery from the circuit when the relay is energized. The relay energizes the solenoid in response to closing the starting switch of a power tool connected with the circuit.

4 Claims, 2 Drawing Figures

ALTERNATOR POWER SOURCE

BACKGROUND OF THE INVENTION

1. Field of the Invention

The present invention relates to the use of a motor vehicle electrical system to provide a power source for a remote electrical load. More particularly the power output accessory unit of this invention, operated in conjunction with the conventional electrical system of a combustion engine powered vehicle appropriately controlled as to voltage and current output by regulation of the speed of the engine of the vehicle, functions to provide a DC power output at a voltage adequate for operation of a power tool and at a current within the design power rating of the engine driven dynamo of the vehicle.

It is frequently desirable in outdoor service or repair work to use electric power driven hand tools where no source of electricity is readily available. Service and repair work is frequently done by personnel having a pickup truck, or the like, but service trucks are not ordinarily provided with electric generators capable of powering electric hand tools. Most vehicle engines are now equipped with an alternator which is capable of supplying the necessary voltage for operating electric hand tools. A conventional vehicle alternator is three-phase wound having a mechanically driven rotor which produces alternating current rectified by diodes to provide a direct current and maintain the vehicle battery substantially fully charged. However, to utilize an alternator for producing sufficient voltage for operating electric hand tools it is necessary that the wiring from the alternator to the battery of the vehicle be interrupted or disconnected to prevent damage to the battery and other components. I accomplish this by interposing a magnetic switch in the alternator to the battery wiring which is opened by a relay energized by closing a power tool switch prior to an increase of the engine speed.

2. Description of the Prior Art

The most pertinent prior U.S. Pat. is No. 3,553,473 which discloses a combustion engine driven power source for a remote power unit and features a vacuum diaphragm operated battery disconnect switch.

This invention is distinctive over this patent by replacing the diaphragm operated battery disconnect switch with a magnetic switch operated prior to increase of voltage thus substantially eliminating arcing and "burning" of battery connect and disconnect contacts. Additionally circuitry is provided to prevent starting the vehicle engine when the gear train thereof is engaged.

SUMMARY OF THE INVENTION

A primary relay is interposed in the alternator to the battery wiring. A vacuum operated diaphragm, connected with the engine accelerator linkage, is operated by a solenoid controlled valve. A power tool connector plug forms part of a circuit from the alternator to the primary relay for energizing the primary relay in response to the closing of a power tool switch so that the primary relay, when energized, opens the alternator to battery wiring and connects the battery to the solenoid vacuum valve for advancing the engine accelerator. Other circuit components interposed in the solenoid to ground connection prevents starting the vehicle engine under unsafe conditions.

The principal object of this invention is to provide an auxiliary electromechanical power source kit which utilizes a vehicle alternator as an electrical power source connected through safety switches to insure operation under safe conditions.

DESCRIPTION OF THE PREFERRED EMBODIMENTS

Figure 1:
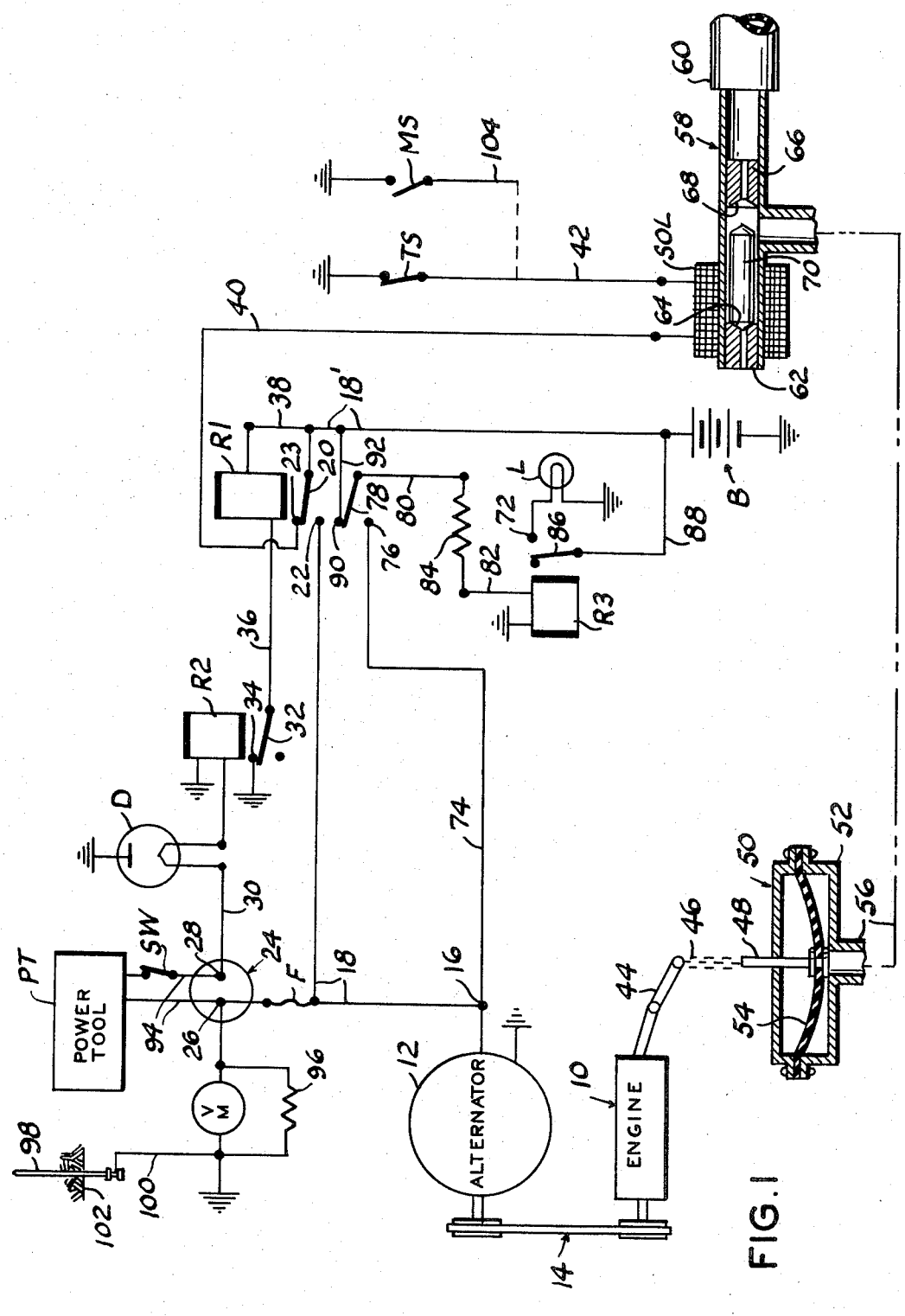
FIG. 1 is a schematic of one embodiment of the components and circuits.

Like characters of reference designate like parts in those figures of the drawings in which they occur.

In the drawings:

Referring more particularly to FIG. 1, the reference numeral 10 indicates a conventional vehicle engine driving an alternator 12 by a belt and pulley means 14. One terminal of the alternator is grounded and its output terminal 16 is normally connected to a 12 volt battery B by cables 18 and 18' through a voltage regulator, not shown. The ground shown represents the vehicle frame as is conventional in vehicle circuits. The voltage regulator performs no function in connection with the invention. The cable 18' is connected with an armature 20 and the cable 18 is connected with one terminal 22 of a primary relay R1. The armature 20 and its terminal 22 forms a normally closed magnetic switch in the alternator to battery wiring. The armature 20 also makes with another terminal 23 of the relay R1 as hereinafter explained. In normal operation of the vehicle the armature 20 is closed with its terminal 22 to complete the circuit from the alternator to the battery.

A conventional electrical power output socket or receptacle 24 has one of its terminals 26 connected with the battery cable 18 through a fuse F. The other output terminal 28 of the electrical receptacle is connected with one lead of the cathode of a diode D by a wire 30. The anode of the diode D is grounded and its other lead or output terminal is connected to one end of the coil of a leaf relay R2. The other end of the coil of relay R2 is connected to ground. Relay R2 is provided with an armature 32 and a grounded terminal 34. The armature 32 of relay R2 is connected with one end of the coil of relay R1 by a wire 36 and the other end of the coil of relay R1 is connected to the battery cable 18' by a wire 38. The terminal 23 of relay R1 is connected with one end of the coil of a solenoid SOL by a wire 40. The other end of the coil of the solenoid is connected to ground through the vehicle transmission safety switch TS by a wire 42.

The engine accelerator linkage 44 is connected by a ball chain 46 to one end of a shaft 48 forming a part of a vacuum unit 50. The vacuum unit 50 comprises a closed housing 52 containing a diaphragm 54 for advancing the accelerator linkage in response to a vacuum pull on the diaphragm 54. The vacuum unit communicates with one end of a tube 56 connected with the stem of a tubular T-shaped member 58 at its other end. The axis of the other ends of the T-shaped unit 58 is preferably vertically disposed. The depending end of the T-shaped tube is connected with the engine vacuum source, indicated by the tube 60. The other end of the vertically disposed portion of the T-shaped tube is open to the atmosphere and is surrounded by the coil of the solenoid SOL. The open end of the T-shaped tube is partially closed by a centrally drilled plug-like member 62 having a downwardly facing seat 64. The vacuum connected end portion of the T-shaped tube similarly contains a centrally drilled plug-like member 66 having a similar tapered seat 68 facing toward the open end of the T-shaped tube. The bottom seat 68 is normally closed by a gravity actuated plunger 70 having opposing tapered end surfaces cooperatively seating and sealing with the seats 64 and 68. The solenoid SOL lifts the plunger 70 off its seat 68 in the manner presently explained.

The vehicle is normally provided with a charge indicator lamp L. One terminal of the lamp L is grounded and its other terminal is connected with a terminal 72 of a third relay R3. Relay R3 is energized by a wire 74 connected with the alternator output 16 and connected at its other end to a third terminal 76 of relay R1 normally contacted by a second armature 78 of relay R1 which is, in turn, connected to one end of the coil R3 by wires 80 and 82 through a series connected resistor 84. The other end of the coil of relay R3 is grounded. The purpose of the resistor 84 is to prevent damage to relay R3 by excessive voltage. The armature 86 of relay R3 is connected to the battery cable 18' by a wire 88. A fourth terminal 90 of relay R1, which makes with armature 78 when relay R1 energizes, is connected to the battery cable 18' by a wire 92.

A power tool PT, containing a normally open starting switch SW, is connected by its wiring 94 to the terminals 26 and 28 of the power output receptacle 24. One of the terminals of the receptacle 24, preferably the terminal 26, is connected to ground through a voltmeter VM, shunted by a suitable resistor 96, to register the voltage available for the power tool PT. As a safety feature, the high voltage power tool operation circuit may be connected to the earth by a ground rod 98 secured to a wire 100 connected with the grounded terminal of the voltmeter for inserting the rod 98 into the surface of the earth, indicated at 102.

OPERATION

In operation the vehicle engine 10 is normally running at an idling speed and armatures 20 and 78 of relay R1 are closed with their respective terminals 22 and 76 so that current from the alternator 12 is charging the battery B over cables 18 and 18' through the armature 20. The relay R3 is energized so that its armature 86 breaks from its terminal 72 so that the lamp L is de-energized. When the power tool switch SW is closed, current from the cable 18 is applied to the diode D and its 0.6 output voltage energizes the leaf relay R2 closing its armature 32 with its grounded terminal 34 thus energizing relay R1 by its battery connected wire 38. Energizing relay R1 closes its armatures 20 and 78 with their other respective terminals 23 and 90. Relay R1 armature 20, breaking from its terminal 22, interrupts current from the alternator to the battery and making with its terminal 23 applies current to the solenoid coil by wire 40. If the vehicle transmission shifting mechanism, not shown, is in neutral so that its safety switch TS is closed the coil of the solenoid SOL is energized, however, if the vehicle is in gear, the safety switch TS will be open thus maintaining the coil of the solenoid SOL de-energized, the engine 10 continues at idling speed, and the power tool PT cannot be operated. As an alternative to using the transmission safety switch TS the solenoid coil to ground wire 42 may be connected to ground through a normally open manual switch MS by a wire 104 so that the switch MS must be closed, manually, to energize the solenoid. When the coil of the solenoid SOL is energized it lifts the plunger 70 off the seat 68 for seating and sealing with the upper seat 64 so that the vacuum pull of the engine is applied to the vacuum unit 50 moving the diaphragm 54 to the position shown in FIG. 1 for operating the accelerator linkage 44 for advancing the rpm of the engine 10 to a predetermined setting thus increasing the current output of the alternator 12 to a predetermined value, for example 115–120 volts. As long as the power tool switch SW remains closed, the diode D grounds the power tool circuit except for the small output voltage which maintains relay R2 energized while the battery B maintains relays R1, R3 and the solenoid SOL energized so that the entire current output of the alternator is available for the power tool and no current is being applied to the battery from the alternator. When the power tool switch SW is released and opens, current to relay R2 is interrupted, which de-energizes in turn de-energizing realy R1 and the solenoid. De-energizing relay R1 again connects the alternator with the battery and relay R3 by armatures 20 and 78 making with their respective terminals 22 and 76 while the de-energized coil of the solenoid permits the plunger 70 to seat by gravity with its seat 68 thus opening the vacuum housing 50 to the atmosphere so that the spring urged accelerator linkage returns the engine to its normal idling speed.

Figure 2:
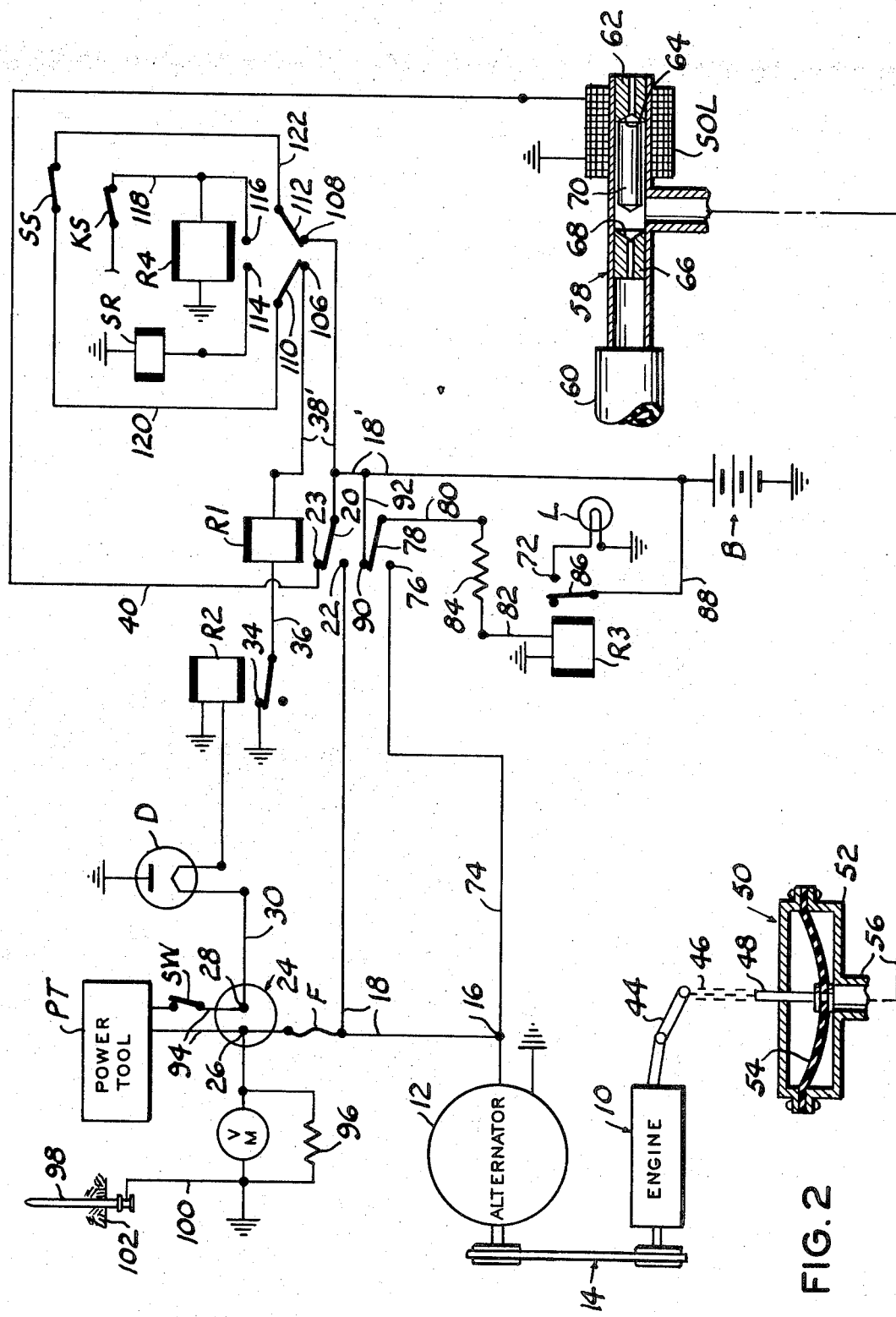
FIG. 2 is a view similar to FIG. 1 illustrating an engine starting safety circuit.

Referring now more particularly to FIG. 2, identical numbered parts function in an identical manner to that described hereinabove. In this embodiment the battery connected wire of the primary relay R1 is divided, as at 38', and connected, respectively, to a pair of terminals 106 and 108 forming a part of a fourth relay R4 having a pair of armatures 110 and 112, respectively, contacting these terminals and a second pair of terminals 114 and 116.

An ignition key operated switch KS, connected at one end with the battery B, in a conventional manner, is connected at its other end to the relay R4 terminal 116 by a wire 118. One end of the coil of relay R4 is connected to the wire 118 and the other end of the coil of relay R4 is connected to ground. Relay R4 terminal 114 is connected to ground through a vehicle starting relay SR. The armatures 110 and 112 of relay R4 are connected together by wires 120 and 122 through the vehicle automatic transmission safety switch SS. Obviously if the vehicle is not provided with an automatic transmission then the switch SS would be replaced by a manually operated switch as disclosed hereinabove for FIG. 1.

In the operation of the engine starting safety features relay R4 armatures 110 and 112 are normally in the position shown. The ignition key, not shown, closes switch KS energizing relay R4 so that its armatures 110 and 112 make with their respective terminals 114 and 116 to complete a circuit to the starting relay SR through the transmission safety switch SS to start the engine 10. In the event the starting switch SS is not closed, as by the vehicle being in gear, the engine cannot be started. When the engine starts and is operating at an idling speed, release of the ignition key permits the switch KS to open thus interrupting current to relay R4 which, when de-energized, permits its armatures to make with its terminals 106 and 108. Closing the power tool switch SW then initiates the cycle of operation described hereinabove for FIG. 1.

Obviously the invention is susceptible to changes or alterations without defeating its practicability, therefore, I do not wish to be confined to the preferred embodiment shown in the drawings and described herein.

I claim:

1. A vehicle operated power source in combination with an accelerator equipped internal combustion engine driving an alternator and having its power output connected with the vehicle battery by wiring, the improvement comprising:

a primary relay having a coil and having one end of its coil conected with said battery,
    said primary relay having a magnetic switch, including first and second terminals, connected in series when closed with said first terminal, in the alternator output to battery wiring;
a normally open circuit connected in series with said alternator power output,
    said circuit including a pair of power output terminals,
    one said power output terminal being connected with said alternator power output,
a second relay,
    said second relay having a coil having one of its ends grounded and having its other end connected with the other said power output terminal,
    said second relay having a normally open magnetic switch connecting the other end of said primary relay coil with ground when said second relay switch is closed;
a solenoid having one end of its coil grounded and having its other end connected with said primary relay second terminal,
    said solenoid being energized when said primary relay is energized and being operatively connected with said accelerator for moving said accelerator in an engine accelerating direction; and,
means bridging said power output terminals for energizing said relays and said solenoid.

2. The combination recited in claim 1 in which the bridging means includes an electrical power operated tool having a closeable electrical circuit connected in series with said pair of power output terminals.

3. The combination recited in claim 2 and further including at least one safety switch connected in series between the first named end of said solenoid coil and ground.

4. The combination recited in claim 3 in which said vehicle is provided with an automatic transmission and an engine starting and operating electrical circuit,
    said safety switch forming a part of said engine starting and operating circuit.

* * * * *